United States Patent
Fox et al.

[11] 3,720,940
[45] March 13, 1973

[54] METHOD AND APPARATUS FOR SORTING PACKAGES AND THE LIKE

[76] Inventors: Henry L. Fox, 514 Fountain Street, New Haven, Conn.; Mark Hubelbank, 39 Laurel Street, Somerville, Mass.

[22] Filed: Sept. 29, 1970

[21] Appl. No.: 76,359

[52] U.S. Cl. ............343/6 R, 340/258 R, 340/280, 343/6.5 LC
[51] Int. Cl. ................................G01s 9/56
[58] Field of Search ..343/6 R, 6.5 R, 6.5 LC, 6.5 SS; 340/258 R, 258 B, 280

[56] References Cited

UNITED STATES PATENTS

| | | | |
|---|---|---|---|
| 3,521,280 | 7/1970 | Janco et al. | 343/6.5 SS |
| 3,377,616 | 4/1968 | Auer, Jr. | 343/6.5 SS X |
| 3,384,892 | 5/1968 | Postman | 343/6.5 R |
| 2,499,225 | 2/1950 | Marshall | 343/6.5 R X |

*Primary Examiner*—Malcolm F. Hubler
*Attorney*—Lane, Aitken, Dunner & Ziems

[57] ABSTRACT

A method and apparatus for detecting the presence of an electrical element responsive to a particular electrical signal and suitable for use, for example, in sorting luggage and the like. In the preferred embodiment, a reradiator responsive to a particular frequency is secured to a tag attached to a piece of luggage. A signal generator is oriented in proximity with the passage of luggage in a baggage conveying system. A circuit is provided which includes a threshold detector for generating a signal when the reradiator responsive to a predetermined frequency passes in proximity to a signal from the signal generator. The circuit includes a digital decoder network for generating an error signal when misdirected luggage intercepts the signal from the signal generator. A package detector unit, including a photoelectric network is included with the circuit to provide an indication that a package was missed when a predetermined combination of input signals was not received by the circuit within a predetermined time after the passage of the package.

18 Claims, 6 Drawing Figures

INVENTORS
HENRY L. FOX &
MARK HUBELBANK

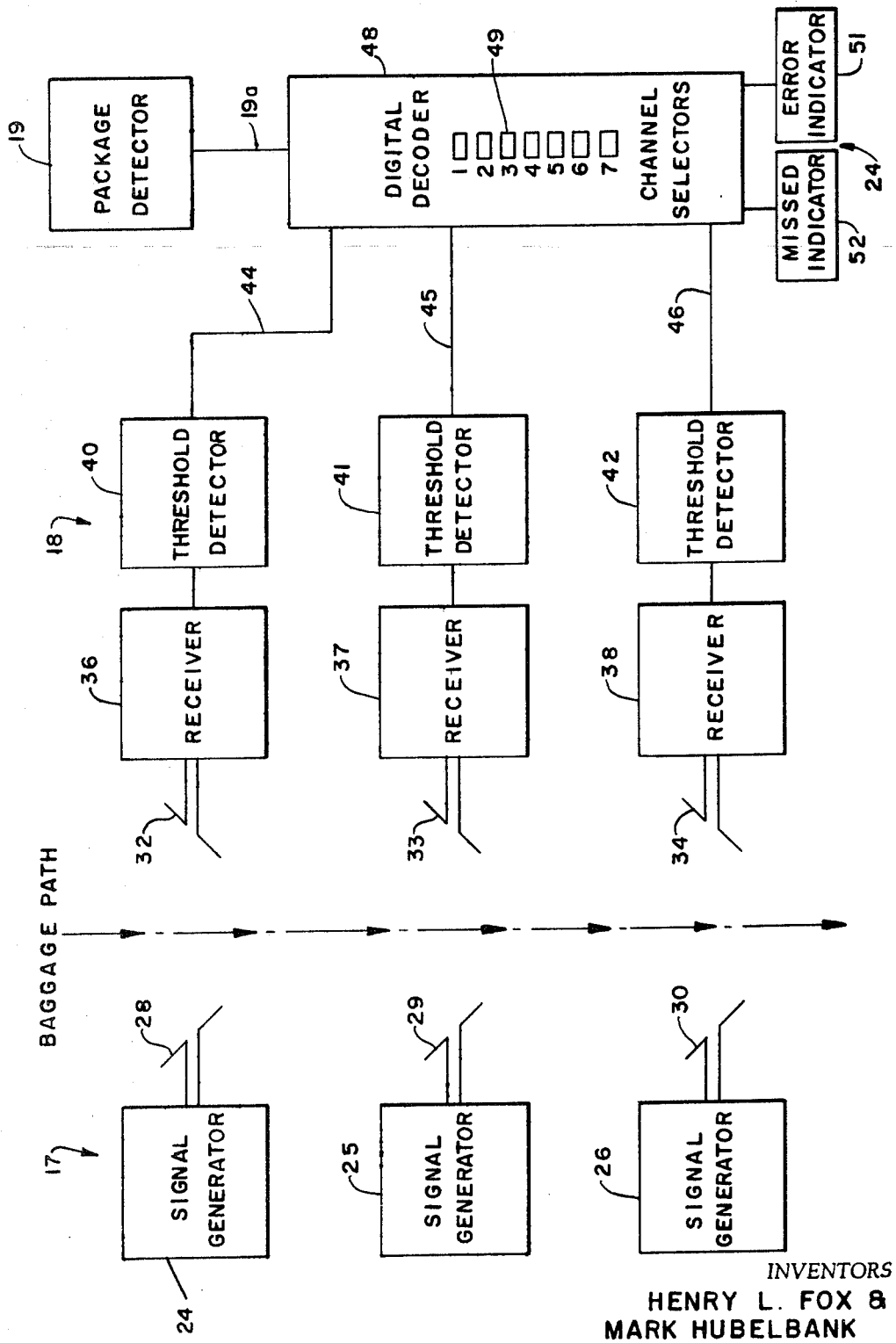

INVENTORS
HENRY L. FOX &
MARK HUBELBANK

BY Lane, Aitken, Dunner & Ziems
ATTORNEYS

METHOD AND APPARATUS FOR SORTING PACKAGES AND THE LIKE

BACKGROUND OF THE INVENTION

This invention relates to a method and apparatus for the detection of an electrical element responsive to a predetermined frequency. More particularly, this invention relates to a method and apparatus for detecting a generated signal when an electrical element responsive to a predetermined frequency is interposed between a signal generator and a receiver circuit. Still more particularly, this invention relates to a method and apparatus for determining the presence of misdirected luggage in a baggage conveying system wherein a reradiator responsive to a predetermined frequency causes an electrical circuit to provide an indication of whether such luggage has been properly directed.

It is a problem in the art to handle the luggage of travelers rapidly and efficiently in mass transportation networks. Conventionally, such baggage is handled manually by observing the indicia located on a tag secured to the baggage and directing the baggage to a predetermined location in the baggage conveying system. Such a system has substantial shortcomings in that no means are generally provided for detecting the presence of inadvertently misdirected baggage. Thus, luggage destined for point A, but inadvertently included with luggage destined for point B, is not generally located until it arrives at point B causing great inconvenience to the traveler, as well as embarrassment and sometimes financial loss to the carrier. Accordingly, it is an aim of this invention to provide a method and apparatus for determining the presence of the misdirected luggage in a baggage conveying system.

The electrical arts have produced a number of circuits which are capable of detecting the presence of a tuned resonant element. Such circuits have been used, for example, to detect stolen goods or the presence of ferromagnetic substances located in proximity to a tuned circuit. However, such tuned resonant circuits have not generally been adapted for use in connection with baggage sorting or detection systems. Moreover, such circuits have not been suitable for a number of installations because of the need to place the tuned circuit near the receptor circuit or cause the ferromagnetic element to intercept the magnetic field of the circuit. Thus, it is another aim of this invention to provide circuit means for use for the baggage detecting system which are highly sensitive and which avoid error in the detection process, while yet having great versatility and adaptability to a number of locations.

Thus, it is an object of this invention to provide a method and apparatus for detecting the presence of an electrical element responsive to a predetermined electrical signal.

It is another object of this invention to provide a method and apparatus for generating a signal for causing an electrical circuit to provide an output indication when a properly tuned electrical element is located in proximity with a signal generator and the electrical circuit.

Still more particularly, it is an object of this invention to provide a method and apparatus for detecting the presence of a reradiator element having predetermined electrical characteristics secured to a baggage tag in a baggage conveying system.

Still another object of this invention is to provide a signal by the detection of a circuit element by circuit means which indicates that the baggage has been misdirected.

It is a more general object of this invention to provide means for detecting the presence of an electrical element located on a passing article or object and providing an output signal indicative thereof which may be used for a variety of purposes, such as error detection, counting, and the like.

These and other objects of the invention will become apparent from the review of the detailed description of the invention which follows, taken in conjunction with the accompanying drawings.

BRIEF SUMMARY OF THE INVENTION

Directed to overcoming the problems in the prior art, and to achieving the objects stated above, this invention is related to a method and apparatus for detecting the presence of a electrical element responsive to a particular signal disposed in proximity with a signal generator and circuit means for providing an indication of the presence of such element.

Preferably, the signal generator is an audio-modulated FM signal generator for transmitting a signal from an antenna. A frequency selective receiver is disposed adjacent the baggage handling tag for receiving the generated signal. A threshold detector is in a circuit with the receiver for producing a digital signal when a responsive reradiator is located in proximity with the signal from the generator and with the receiver. A digital decoder network is in circuit with the receiver and threshold detector to produce an error signal when a predetermined input signal is not produced by the receiver and threshold detector.

Preferably, a plurality of generators and receivers are used to generate a plurality of digital signals to the digital decoder network. In this case, the decoder network produces an error signal or a missed package signal in response to predetermined combinations of input signals to the decoder. On the other hand, if a properly responsive reradiator intercepts the generated signal, no signal is produced by the digital decoder network.

The method according to the invention comprises the steps of generating an electrical signal, receiving said electrical signal and providing a digital signal in response thereto when a properly responsive electrical element is located in proximity with said generated signal, and decoding said digital signal to provide an error signal when said digital signal indicates the presence of an erroneous electrical element. The method also includes the steps of generating a package detection signal, and generating a missed package signal if a predetermined digital signal is not received by the digital decoder network for a predetermined time after said package detection signal is received. In a preferred embodiment, the method includes the step of securing a reradiator to a piece of luggage so that the output signal of the digital decoder can detect misdirected luggage.

BRIEF DESCRIPTION OF THE DRAWINGS

In the drawings:

FIG. 2 is a block diagram of the circuit according to the invention;

DETAILED DESCRIPTION OF THE PREFERRED EMBODIMENT

Figure 1:
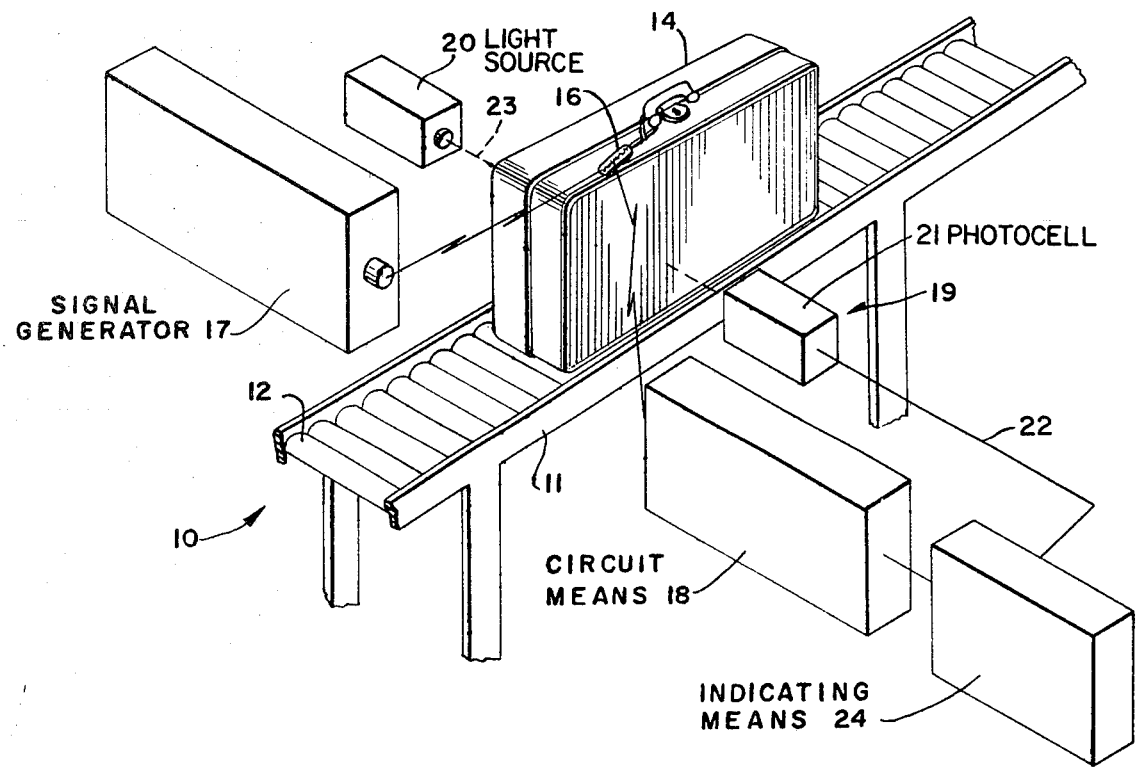
FIG. 1 is a perspective view, partially in block form, depicting the method and apparatus according to the invention for use in sorting luggage.

In FIG. 1, a baggage conveying system is designated generally by the reference numeral 10. The system 10 comprises a conveyor 11 having a plurality of rollers 12 located thereon for conveying luggage, such as a suitcase 14, from one location to another in a baggage conveying system. The system 10 may be a portion of a more elaborate network, such as may be used by airlines in sorting and conveying luggage.

The suitcase 14 is provided with a baggage tag 16 which includes a reradiator for receiving a signal from a signal generator 17 and retransmitting the signal to the circuit means 18 to generate a digital signal when the reradiator is tuned to the frequency of the transmitted signal from the generator 17, as will hereinafter be discussed in greater detail.

A package detection system is designated generally by the reference numeral 19 and comprises a light source 20 and a photocell 21 located approximately in register therewith for generating a signal on lead 22 to the circuit means 18 to indicate when a package has intercepted a light beam, designated generally by the reference numeral 23, passing between the light source 20 and the photocell detector unit 21. Indicating means 24 are provided in circuit with the circuit means 18 to indicate when the suitcase 14 has been improperly placed on the conveying system. For example, it may be desired that all of the luggage located in the conveyor system are intended to be conveyed to a particular location or plurality of locations. When indicia on the baggage tag 16 indicates that the baggage is properly located, no signal will appear on the indicator means 24. On the other hand, when the suitcase 14 is mislocated, such as would be the case when a suitcase intended to be conveyed to location A has been inadvertently included with luggage intended to be conveyed to location B, the indicating means 24 will provide a signal indicating that condition.

As may be seen in the embodiment shown in FIG. 2, the signal generating means 17 comprise a plurality of signal generators 24, 25, and 26, each of which is capable of producing a radio frequency signal, preferably between 5 and 100 mhz, which is respectively radiated by the transmitting antennas 28, 29, and 30, respectively.

Figure 3:
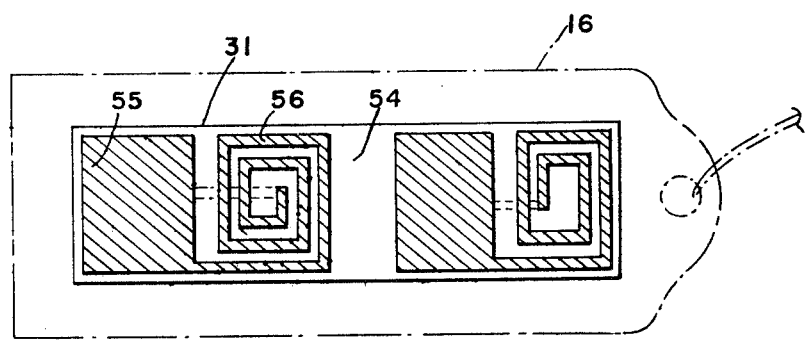
FIG. 3 is a plan view of the reradiator in combination with a tag for attachment to luggage.

A reradiator 31 is secured to the baggage tag 16 as shown in FIG. 3. If the reradiator 31 is appropriately tuned to the frequency of the generators 24, 25, or 26, the reradiator 31 will receive the signal transmitted therefrom and retransmit the signal so that the signal may be received by the antennas 32, 33, and 34 provided by the circuit means 18.

The circuit means 18 comprise a plurality of receivers 36, 37, and 38, each of which is in circuit with a threshold detector 40, 41, and 42 respectively. Each of the threshold detectors provides a digital signal upon leads 44, 45, and 46, respectively, to a digital decoder circuit 48 having a plurality of channel selectors 49 located thereon.

The indicating means 24 include an error indicator 51 and a "missed package" indicator 52. The error indicator, for example, a light or an audible warning device, indicates that the baggage has been misdirected, while the missed indicator 52 provides an indication that, while a package has been detected by the package detector 19, the correct input to the digital decoder has not been received during the time that the package detector 19 indicated the presence of a package, or for a predetermined time thereafter.

The receiver antennas 32, 33, and 34 are designed and oriented so that, in the absence of a reradiator 31, a relatively small, or no signal, will be received from the signal generators 24, 25, and 26. When the signal has been reradiated, the received signal on antennas 32, 33, and 34 will be received and amplified by the frequency selective receivers 36, 37, and 38 which will respond only to a signal at the frequency of a corresponding signal generator 24, 25, or 26 respectively. Thus, each receiver may discriminate against improper signals both through the presence of a reradiator and by virtue of its frequency selective characteristics. When the received signal has a sufficient magnitude, caused, for example, by the presence of a reradiator, the signal will trigger the associated threshold detector 40, 41, or 42 to indicate the presence of a reradiator 31 on a baggage tag 16 which is tuned to the predetermined frequency of the receiver 36, 37, or 38 respectively.

The digital decoder network 48 will then determine if the correct combination of signals has been received. In that case, no indication is provided by the indicator means 24. However, if the combination is incorrect, the error indicator 51 is actuated. If the package detector 19 has detected a package, but none of the receivers 36, 37, or 38 detected a signal, the missed indicator 52 will be actuated to indicate that a package passed which either did not have a reradiator 31, or had an incorrectly attached reradiator 31.

As may be seen in FIG. 3, a reradiator 31 includes a piece of insulating material 54 on which a set of condenser plates, designated generally by the reference numeral 55, has been deposited together with coils 56 made from a conducting material such as copper. The combination of the condenser 55 and the coil 56 on each reradiator 31 is tuned for a predetermined frequency. Each tag may include from one or more sets of coils and condensers, with the embodiment of FIG. 3 illustrating a tag 16 which includes a reradiator 31 in which two sets of coils 56 and condensers 55 have been deposited. Accordingly, the system provides a versatility in selecting luggage for its plurality of locations, such as would be the case for luggage loaded at point A in an airlines system and including baggage intended for points B, C, or D. While the specific embodiment shown includes three such networks, it should be understood that the number of tuned circuits on the reradiator is primarily a function of the convenience of the user. For example, if in a particular installation, all baggage is intended for a single point of termination B, only one tuned circuit need be included on the reradiator and only one set of signal generators and receivers will be necessary to comprise the signal generator 17 and the circuit means 18. Thus, the system shown in FIG. 2, is capable of detecting luggage properly directed to any one of seven locations by selective actuation of the channel selector. If additional locations are desired to be detected, additional signal generators in combination with the associated receivers and threshold detectors may also be used with corresponding modifications to the digital decoder.

Figure 4:
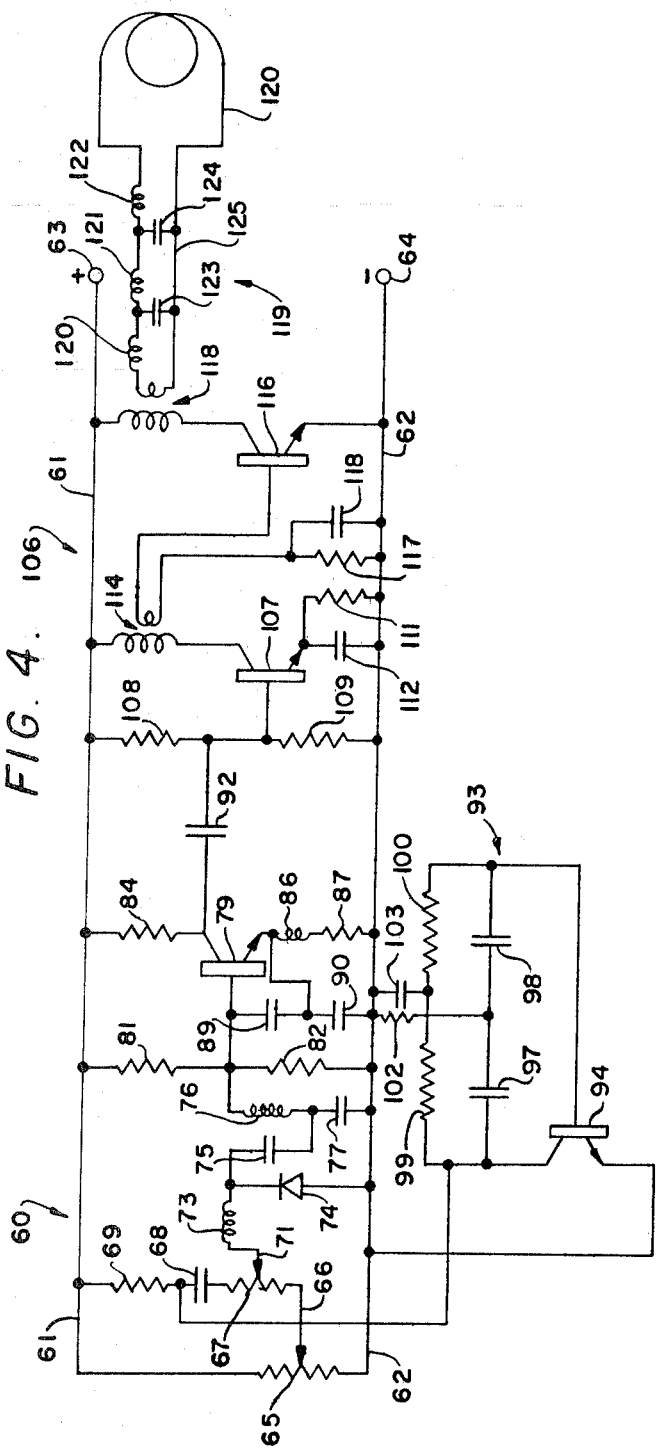
FIG. 4 is a detailed circuit diagram of a signal generator for use in the apparatus of FIGS. 1 and 2.

A specific embodiment of a suitable generator is shown in detail in FIG. 4 and comprises a voltage controlled oscillator designated generally by the reference numeral 60. A positive source of supply is provided on lead 61, while a negative source of supply is provided on lead 62 by the application of a source of power between terminals 63 and 64 respectively. A variable resistor 65 is connected between the buses 61 and 62 for adjusting the magnitude of the bias voltage provided at its wiper. The wiper 66 on the resistor 65 is connected to a variable resistor 67 in a series circuit with capacitor 68 and collector resistor 69. The wiper 71 on the variable resistor 67 is in circuit with a coil 73 to provide a modulating input signal to the voltage controlled oscillator 60.

The coil 73 is connected to one terminal of a diode 74, which acts as the variable element in the voltage controlled oscillator 60. The diode is coupled through a capacitor 75 to the common junction between a coil 76 and a capacitor 77. The output from the coil 76 provides the input to the base of a transistor 79 which comprises the active element of the voltage controlled oscillator 60. The base of the transistor 79 is biased by resistors 81 and 82 which are connected in series between buses 61 and 62 respectively. The collector of the transistor 79 is connected to the positive supply on lead 61 through the collector resistor 84, while the emitter of the transistor 79 is connected through a coil 86 and a resistor 87 to the negative supply on lead 62. The base of the transistor 79 is also connected to the negative supply 62 through the series-connected capacitors 89 and 90, the common junction between which is connected to the common junction between the emitter of the transistor 79 and the coil 86. The circuit components designated by the reference numerals 74 to 90 operate as a voltage controlled oscillator which generates an FM signal which is modulated by an audio oscillator, designated generally by the reference numeral 93. The audio oscillator 93 generates an audio signal which modulates the FM signal from the oscillator 60.

The audio oscillator 93 comprises a transistor 94 having its emitter connected to the negative supply on lead 62. A series circuit comprising capacitors 97 and 98 is connected in parallel with resistors 99 and 100, the parallel combination of which is connected between the collector of the transistor 94 and its base. The common junction between the capacitors 97 and 98 is connected through a resistor 102 to the negative supply 62, while the common junction between resistors 99 and 100 is connected through a capacitor 103 to the negative supply 62. Thus, the circuit components designated by the reference numerals 65 to 73 and 94 to 103 operate as an audio oscillator to modulate the FM signal generated by the voltage-controlled oscillator 60.

The modulated FM signal at the collector of transistor 79 is coupled through a capacitor 92 to provide the input to a two stage amplifier designed generally by the reference numeral 106. The amplifier 106 comprises a transistor 107 having its base biased by the series combination of resistors 108 and 109 connected between leads 61 and 62, and its emitter connected to the negative bus 62 through resistor 111. A frequency compensating capacitor 112 is connected in parallel with resistor 111.

The output from the collector of the transistor 107 is coupled by a wide band transformer 114 to provide the input to the base of a transistor 116. The primary of the transformer 114 is connected between the collector of the transistor 116 and the positive bus 61. The secondary of the transformer 118 provides the input to the matching and filtering network 119. The matching and filtering network 119 comprises a plurality of series connected coils 120, 121, and 122 in circuit with one terminal of the secondary of the transformer 118. The common junctions between the coils are connected respectively by capacitors 123 and 124 to lead 125. Thus, the circuit of FIG. 4 is capable of transmitting an audio modulated FM signal from antenna 120.

Figure 5:
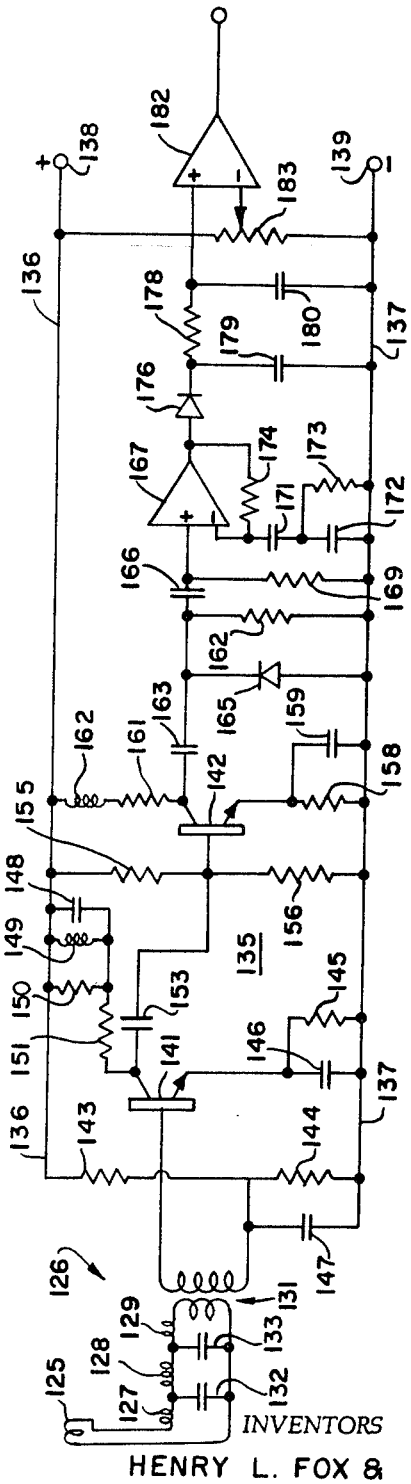
FIG. 5 is a detailed circuit diagram of the receiver and detector circuit comprising the circuit means shown in block form in FIG. 1 and as shown in FIG. 2.

A detailed circuit diagram of the receiver and detector circuit designated by the numeral 18 in FIG. 2 is shown in FIG. 5. The signal generated from the antenna 120 is received by the antenna 125 when properly oriented which corresponds to any one of the antennas 32, 33, or 34 shown in FIG. 2. The received signal is filtered and matched to the input of the receiver by a filtering and matching network designated generally by the reference numeral 126.

The network 126 comprises a plurality of inductors 127, 128, and 129 connected in circuit with the primary of transformer 131. The common junctions between the coils are connected to one terminal of the primary of transformer 131 through capacitors 132 and 133 respectively. The filtered and matched input signal is coupled through the wide band transformer 131 to a two stage amplifier designated generally by reference numeral 135. A positive source of potential is provided on terminal 138 to a positive bus 136, and a negative source of potential is provided at terminal 139 to the negative bus 137.

The amplifier 135 is a two stage RC coupled amplifier comprising transistors 141 and 142 respectively. The base of the transistor 141 is biased by the series resistors 143 and 144. The emitter of the transistor 141 is connected to the negative bus 137 through the emitter resistor 145, which is connected in parallel with capacitor 146. A capacitor 147 is connected between one terminal of the secondary of the transformer 131 to the negative supply 137 to assist in controlling the frequency response of the amplifier 135.

A tank circuit comprising a capacitor 148 connected in parallel with an inductor 149 and a resistor 150 is connected through a resistor 151 to the collector of the transistor 141. The tank circuit has been provided to control the frequency response of the amplifier 141. The output from the collector of the transistor 141 is coupled through the coupling capacitor 153 to the base of the transistor 142.

The base of the transistor 142 is biased by the series combination of resistors 155 and 156 which are connected between the positive bus 136 and the negative bus 137. The emitter of the transistor 142 is connected to the negative bus 137 through the parallel combination of a resistor 158 and a capacitor 159. The collector of the transistor 142 is connected to the positive bus 136 through a resistor 161 in series circuit with a coil 162. The coil 162 also assists in controlling the frequency response of the amplifier 142. The output from the transistor 142 is coupled through the coupling capacitor 163 to a detector diode 165.

The detected signal is coupled through a capacitor 166 to the input of an operational amplifier 167. The cathode of the diode 165 is connected to the negative bus 137 through an input resistor 168 and the positive input of the operational amplifier 167 is connected to the negative bus 137 through an input resistor 169. The negative terminal on the operational amplifier 167 is coupled to the negative bus 137 through a pair of series-connected capacitors 171 and 172, while a frequency compensating resistor 173 is connected in parallel with capacitor 172. A feedback resistor 174 is connected between the output of the operational amplifier 167 and its negative input.

In operation, in the case in which there is no reradiator 31 located between the generator and the receiver, the received signal is of a relatively constant amplitude. However, if a reradiator is present such as would be the case when an appropriate baggage tag is located between the generator and receiver, the system frequency response includes a peak at about the predetermined frequency of the reradiator. Thus, the frequency response includes a peaked AC component to the detected signal at the input of the operational amplifier 167. Thus, the peaked AC component is amplified by the operational amplifier 167 and rectified by the diode 176.

A filter circuit for the rectified signal comprises a resistor 178 and capacitors 179 and 180 in parallel therewith and connected to the negative bus 137.

The digital detector circuit comprises a comparator 182 having its positive terminal connected to the resistor 178 for receiving the rectified detected signal. A variable resistor 183 is connected between the positive bus 136 and the negative bus 137, the wiper of which is connected to the negative input of the comparator 182. Thus, the reference voltage applied to the negative terminal of the comparator 182 may be adjusted by adjusting the wiper 184 of the variable resistor 183. If the signal detected by the receiver of FIG. 5 has a sufficient magnitude at the predetermined frequency, the output of the digital comparator 182 changes from a logical "0" to a logical "1" level. This digital signal may be used individually to drive a suitable indicating device, or may be used in combination with a plurality of digital signals for the same purpose.

Figure 6:
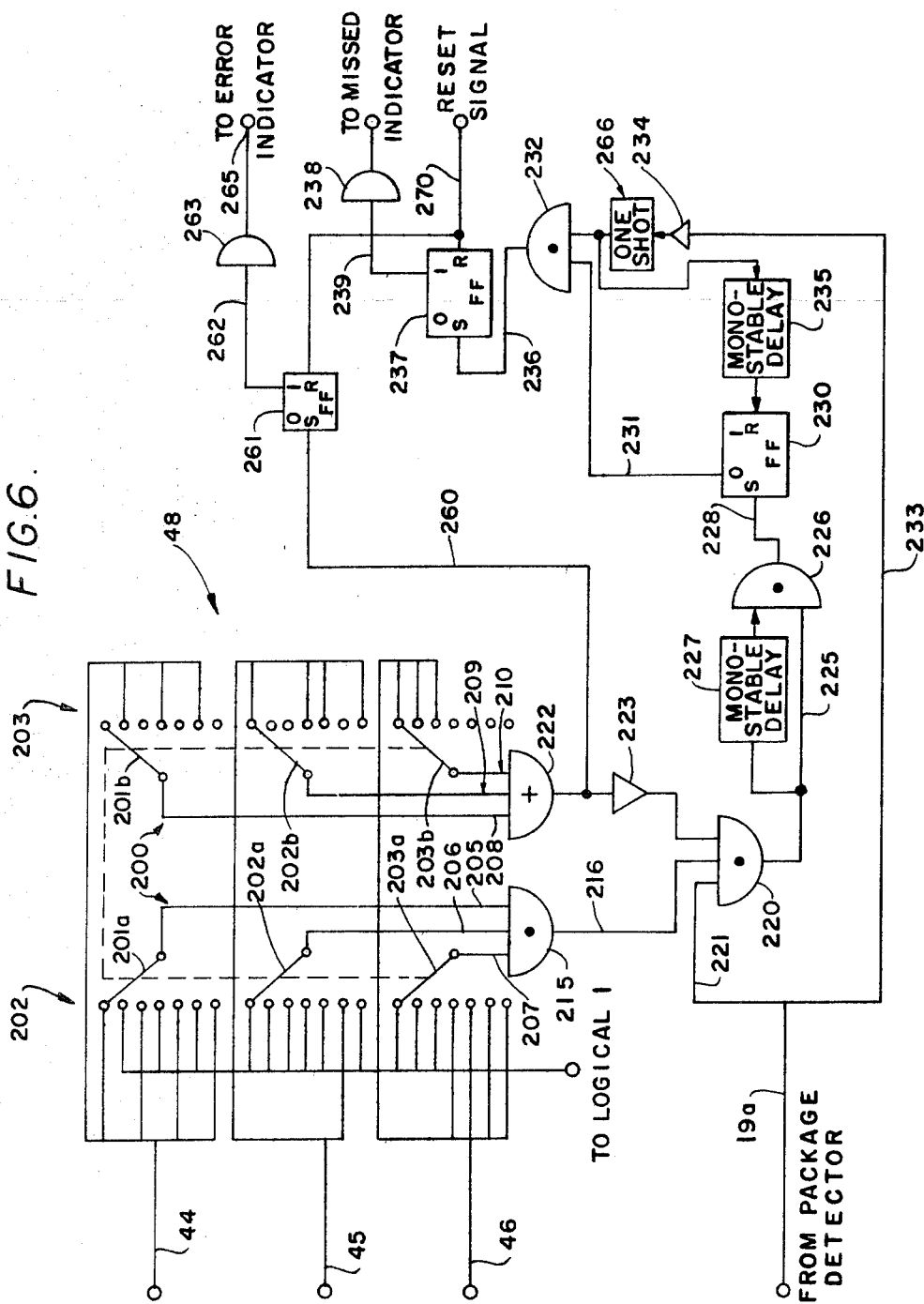
FIG. 6 is a circuit diagram of the digital decoder which is part of the circuit means of FIG. 1 and as shown in block form in FIG. 3.

FIG. 6 is a block diagram of one embodiment of the digital decoder 48 shown and described generally in connection with FIG. 2.

In the embodiment shown, any one of seven channels may be selected by the actuation of a ganged switch designated generally by the reference numeral 200. As shown, the switch 200 may select any one of seven channels in accordance with the depression of channel selector 49 shown in FIG. 2. The output from each threshold detector is provided to the input of each of two banks of switches designated generally by the reference numerals 202 and 203. In the embodiment shown, the switches are positioned in the channel one position, and all switches are so located. Thus, each of the switches 201a, 202a, 203a, 201b, 202b, and 203b is located in its first position. In that position, any signal received on lead 44 will appear on lead 205, while no signal will appear on leads 206 and 207 respectively because of the connection of switches 202a and 203a. On the other hand, any signal on lead 44 will not appear on lead 208, while signals appearing on leads 45 or 46 will appear on leads 209 and 210 respectively. The digital data represented by the signals on leads 44, 45, and 46 may thus be effectively decoded through digital circuits to provide a response indicative of a number of conditions.

For purposes of illustration, assume that luggage has passed the package detector 19, thus generating a signal on lead 19a. Further assume that such luggage has been misdirected, so that no signals appear on the lead 44, since the reradiator on the luggage is not tuned to the frequency of the receiver 36. In that case, no signal will appear on any one of the leads 205, 206, 207, 208, 209, and 210.

Leads 205, 206, and 207 are connected to an AND gate 215. Since the signals at the input of the AND gate 215 are all logical "0," and the output from the AND gate 215 on lead 216 is a logical "0," that signal is provided to an AND gate 220. Since a package has been detected, the signal on lead 19a is provided on lead 221 to an input of the AND gate 220 and since no signals appear on leads 45 and 46, no signal will appear on lead 208 (because of the connection of switch 201b) or on leads 209 or 210 to the input of an OR gate 222. Accordingly, the output of the OR gate is a logical "0" which is converted to a logical "1" by an inverter 223. Under these conditions, not all of the inputs to the AND gate 220 are in a logical "1" state, so that the output from an AND gate 220 is a logical "0" and provides an input on lead 225 to one of the inputs of an AND gate 226. A monostable delay circuit also receives a signal on lead 225 to provide a second input to the AND gate 226. Neither of the inputs to the AND gate 226 are in a logical "1" state so that the output on lead 228 is in a logical "0" state, and is provided to a reset flipflop 230. A logical "1" signal appears on lead 231 since lead 231 is connected to the zero connection of the reset flipflop 230. The reset connection on the reset flipflop 230 is connected to a monostable delay 235.

The signal on lead 19a is also provided on lead 233 to the inverter 234. When the package has passed and the signal on 233 goes to logical "0" the one shot 266 produces an output of "1" for a short time. Since the flipflop 230 is in the reset condition lead 231 has a logical "1" on it and thus for this short time both inputs to the gate 232 have a "1" on them. Thus, a logical "1" signal is generated on lead 236 to the reset flipflop 237. A buffer 238 is connected by lead 239 to the "1" setting on the flipflop 237 so that the signal which appears at terminal 240 is a logical "1" signal or an enabling signal to actuate the missed indicator 52.

Thus, the condition has been described in which the package indicator has indicated that a suitcase has passed the photocells of FIG. 1, but that the signal received and detected by the circuit means has not indicated that the package has been properly directed. Accordingly, the missed indicator is operated.

Assume now for purposes of illustration that properly directed baggage would generate a signal on lead 44. In this case, a signal is generated on lead 205, but no signal is generated on leads 206 and 207 because of the setting of switches 202a and 203a. Accordingly, the AND gate 215 is enabled so that gate 220 is enabled and no signal is generated at the missed indicator. Simultaneously, no signals will appear on leads 208 because of the connection of switch 201b or on leads 209 and 210 because no signal appears on leads 45 and 46. Accordingly, the OR gate 222 will not be enabled and no signal will appear on lead 260. Thus, a set reset flipflop 261 will not be actuated and no signal will be provided on lead 262 to the buffer 263 and no signal will appear on lead 265 to actuate the wrong indicator. Thus, no signal is generated which indicates that all of the baggage has been properly directed. After a delay, the monostable delay circuit 235 would reset the decoder for operation.

Assume now for purposes of illustration that for the switch setting shown, a signal generated on lead 44 in the manner just described is intended to indicate properly directed baggage. But suppose that a signal is generated on lead 46 because of the detection of the reradiator on the misdirected piece of luggage by the receiver 38. In this case, no signal appears on lead 207 because of the setting of switch 203a so that the AND gates 215 and 220 are not actuated and the missed indicator is not actuated by a signal on lead 240 in the manner previously described. However, a signal on lead 46 will provide a signal on lead 210 to the OR gate 222. Since the signals on leads 208 and 209 are zero and the signal on lead 210 is one, the OR gate 222 will provide a signal on lead 260 and a logical one signal will be generated on lead 262 from the flipflop 261. Accordingly, a signal will appear on lead 265 to actuate the wrong indicator indicating that a piece of luggage in the system is misdirected. Such a signal will appraise the attendant of the presence of the misdirected luggage so that its removal may be effected.

After an alarm has been actuated, the system may be reset by a signal on lead 270 from the reset button on a console.

Thus, a system has been described which is capable of electronically detecting the presence of misdirected luggage in a baggage handling system. Such a system has other possible uses as well. For example, the arrangement could be used as a counting circuit by utilizing a counter at the output of the digital detector to count the number of times a race car, for example, one bearing a reradiator, passes a given point on a track. Similarly, the system disclosed could be used in mass mailing systems where a reradiator is included with the address label, whereupon the system would be used by private shippers in cooperation with the postal services.

The exact shape of the antennas 120 and 125 and the frequency at which the units will operate will depend on the nature of the particular installation and the requirements of the Federal Communications Commission. For example, it may be necessary to shield the generator and receiver to prevent spurious emission or spurious actuation.

For completeness of disclosure, the components in FIG. 6 are defined by the following logical relationships. Gates 215, 220, 226, and 232 are AND gates which provide an output of a logical "1" only if all inputs are in a logical "1" state. The OR gate 222 provides an output of a logical "1" if any one of its inputs is in the logical "1" state. Inverters 223 and 224 provide a logical "1" output only if the input is in a logical "0" state. The flipflops 230 and 237 provide an output of a logical "0" if the last logical "1" input was provided to the R input and provides an output of a logical "1" if the last "1" input was to the S input terminal. The output at the "1" terminal is the complement of the output at the "0" terminal. Each of the monostable delay circuits 227 and 235 provide output pulses at some fixed time after the input has changed from logical "0" to a logical "1." The one shot 266 generates the short output pulses after its output has gone from a logical "1" to a logical "0" state.

This invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A circuit for distinguishing articles comprising:
electrical means secured to an article which are capable of being detected by said circuit under predetermined conditions;
signal generating means for generating a signal;
signal receiving means for receiving said signal and providing an output signal indicative of the presence of predetermined characteristics of said electrical circuit mean;
package detection means for detecting the presence of an article and generating a detection signal indicative thereof; and
decoding means responsive to both said output signal and said detection signal for decoding said output signal to provide an indication of whether an article is detected and is included within the class of articles covered by said predetermined conditions and wherein said output signal indicates the absence of said predetermined conditions.

2. The circuit as set forth in claim 1 wherein said electrical means comprises an insulating material including a capacitor and an inductor tuned to a predetermined frequency, said predetermined frequency being said predetermined characteristics so that said signal output means provides an output signal only upon receipt of a signal having a frequency at about said predetermined frequency.

3. The circuit as set forth in claim 1 wherein said electrical means comprises a reradiator.

4. The circuit as set forth in claim 1 wherein said package detection means includes a source of light and photo-responsive circuit means for receiving at least a portion of said light for providing said detection signal when an article intercepts said portion of said light.

5. The circuit as set forth in claim 1 wherein said circuit is positioned relative to a luggage conveying system and said electrical means is secured to said luggage so that said decoding means provides a signal indicating that a piece of luggage is not included within the class of luggage intended for a predetermined destination.

6. The circuit as set forth in claim 1 wherein said signal generating means is a circuit for providing an audio-modulated FM signal tuned to a predetermined frequency.

7. The circuit as set forth in claim 6 wherein said signal receiving means includes a circuit for receiving said signal which is responsive to said predetermined frequency to provide a distinguishable signal having a component indicating the presence of said predetermined frequency and means for distinguishing said component to provide a digital signal indicative of the presence of a predetermined magnitude of said component.

8. The circuit as set forth in claim 1 wherein said signal generating means include a plurality of signal generators; said signal receiving means includes a plurality of signal receivers each of which is in circuit with a detector circuit wherein each of said detector circuits provides a digital output signal indicative of the presence of determined characteristics of said electrical circuit means.

9. The circuit as set forth in claim 8 wherein said decoding means includes switch means capable of being selectively set to receive signals from a first signal source to provide a first output signal and from the remainder of a plurality of sources to provide a second output signal.

10. The circuit as set forth in claim 9 wherein said decoding means includes a plurality of gate circuits connected to receive said first signal and said second signal to provide said indication of whether an article is included within the class of articles covered by said predetermined conditions.

11. The circuit as set forth in claim 10 wherein said decoding means includes means for generating a signal indicating that an article has been missed.

12. A method for distinguishing articles comprising the steps of:
providing electrical means in combination with an article wherein said electrical means are capable of being detected by an electrical circuit under predetermined conditions,
generating an electrical signal,
receiving said signal and providing an output signal which denotes the presence of predetermined characteristics of said electrical circuit means,
detecting the presence of said article,
generating a detection signal indicative of the presence of said article, and
decoding said output signal and said detection signal to provide an indication of whether an article is included within the class of articles covered by said predetermined conditions.

13. The method as set forth in claim 12 wherein the step of providing electrical means is further defined in that said electrical means is a reradiator.

14. The method as set forth in claim 12 wherein the step of detecting is further defined by the steps of providing a source of light, and receiving said source of light in such a manner that said detection signal is generated when an article intercepts said source of light.

15. The method as set forth in claim 12 wherein the step of providing electrical means is further defined in that said electrical means comprises a circuit tuned to a predetermined frequency and the step of receiving is characterized in that an output signal is produced only upon receipt of a signal having a frequency at about said predetermined frequency.

16. The method as set forth in claim 15 is further defined in that the step of providing electrical means is characterized in that said electrical means are provided in combination with luggage to be conveyed in a luggage conveying system.

17. The method as set forth in claim 16 wherein the steps of generating and receiving are performed in proximity with said luggage conveying system.

18. The method as set forth in claim 17 wherein the step of decoding is further defined in that a signal is produced which indicates that a piece of luggage is not included within the class of luggage intended for a predetermined location.

* * * * *